United States Patent
Zhao

(10) Patent No.: US 12,381,399 B2
(45) Date of Patent: Aug. 5, 2025

(54) CONTROL SYSTEM AND METHOD FOR POWER SUPPLY SYSTEM

(71) Applicant: Huawei Digital Power Technologies Co., Ltd., Shenzhen (CN)

(72) Inventor: Huan Zhao, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/366,102

(22) Filed: Aug. 7, 2023

(65) Prior Publication Data

US 2023/0378758 A1 Nov. 23, 2023

Related U.S. Application Data

(63) Continuation of application No. PCT/CN2021/075950, filed on Feb. 8, 2021.

(51) Int. Cl.
*H02J 3/38* (2006.01)

(52) U.S. Cl.
CPC ........... *H02J 3/38* (2013.01); *H02J 2300/24* (2020.01)

(58) Field of Classification Search
CPC ........................................................ H02J 3/16
See application file for complete search history.

(56) References Cited

U.S. PATENT DOCUMENTS

| | | | |
|---|---|---|---|
| 2011/0261601 A1* | 10/2011 | Chapman | H02J 3/40 363/131 |
| 2014/0056041 A1 | 2/2014 | Zhu et al. | |
| 2015/0103573 A1* | 4/2015 | Zhu | H02M 5/4585 363/131 |
| 2015/0372481 A1 | 12/2015 | Roesner et al. | |

FOREIGN PATENT DOCUMENTS

CN 110572184 A 12/2019

* cited by examiner

*Primary Examiner* — Daniel Kessie
(74) *Attorney, Agent, or Firm* — Maier & Maier, PLLC

(57) ABSTRACT

A control system and method for a power supply system. The control system includes a front controller and a front voltage conversion circuit and a post controller and a post voltage conversion circuit. The front voltage conversion apparatus is configured to supply power to the post voltage conversion apparatus through a direct current bus. The post voltage conversion apparatus is configured to: receive electric energy transmitted by the front voltage conversion apparatus through the direct current bus, and supply power to a power grid. The post controller is further configured to transmit, to the front controller through the direct current bus, information indicating that high voltage ride-through occurs on the power grid. Voltage control on the direct current bus does not need to depend on the high-speed communication cable, thereby improving control efficiency of a power supply system.

16 Claims, 6 Drawing Sheets

CONTROL SYSTEM AND METHOD FOR POWER SUPPLY SYSTEM

CROSS-REFERENCE TO RELATED APPLICATION

This application is a continuation of International Application No. PCT/CN2021/075950, Feb. 8, 2021, the disclosure of which is hereby incorporated by reference in its entirety.

TECHNICAL FIELD

The embodiments relate to the field of circuit technologies, a control system, and a method for a power supply system.

BACKGROUND

High voltage ride-through (HVRT) is a capability of ensuring that an electrical connection between a power station and a power grid remains and runs continuously within a voltage rise range and time interval when a voltage of a grid connection point of a power supply system increases due to an accident in a power system. The power supply system may include a front voltage conversion apparatus and a post voltage conversion apparatus. Voltage control on a direct current bus is obtained through contention between a direct current bus voltage required by a maximum power point tracking (MPPT) module of the front voltage conversion apparatus and a direct current bus voltage required by the power grid. When high voltage ride-through occurs on a power grid side, the voltage of the power grid rises. If a voltage of a direct current bus cannot be controlled in a timely manner, the power supply system cannot output active power.

When high voltage ride-through occurs on the power grid side, the voltage of the power grid rises. In this case, the post voltage conversion apparatus obtains a high voltage reference value of the direct current bus through calculation based on a sampled power grid voltage, and notifies, through a high-speed communication cable, the front voltage conversion apparatus to update the voltage reference value of the direct current bus as a voltage value required for high voltage ride-through. A front controller controls the voltage of the direct current bus based on the received voltage reference value of the direct current bus, so as to ensure power output of the power supply system during high voltage ride-through.

When the front voltage conversion apparatus and the post voltage conversion apparatus are separately disposed in two boxes and are far away from each other, a more efficient and feasible control method is needed to cope with a rapid update of the voltage of the direct current bus during high voltage ride-through on the power grid, so as to meet a power output requirement of the power supply system during high voltage ride-through.

SUMMARY

The embodiments may provide a control system and a method for a power supply system, so that voltage control on a direct current bus does not depend on a high-speed communication cable, thereby improving control efficiency of a power supply system.

According to a first aspect, a control system for a power supply system is provided. The control system includes a post voltage conversion apparatus and a front voltage conversion apparatus. The front voltage conversion apparatus includes a front controller and a front voltage conversion circuit, where the front controller is configured to control the front voltage conversion circuit to: receive electric energy provided by a power supply module that is in a power supply system, and supply power to the post voltage conversion apparatus through a direct current bus after the front voltage conversion circuit performs direct current voltage conversion. The post voltage conversion apparatus includes a post controller and a post voltage conversion circuit, where the post controller is configured to control the post voltage conversion circuit to: receive, through the direct current bus, electric energy transmitted by the front voltage conversion apparatus, and supply power to a power grid after the post voltage conversion circuit performs direct current to alternating current voltage conversion. The post controller is further configured to transmit, to the front controller through the direct current bus, information indicating that high voltage ride-through occurs on the power grid.

In the embodiments, the post controller may transmit, to the front controller through the direct current bus, the information indicating that high voltage ride-through occurs on the power grid. In this control solution, a high-speed communication cable is not needed for transmitting, between the front controller and the post controller, the information indicating that high voltage ride-through occurs on the power grid. In other words, voltage control on the direct current bus does not need to depend on the high-speed communication cable, thereby improving control efficiency of the power supply system.

In addition, in the embodiments, voltage control on the direct current bus may not be limited by a communication speed, and therefore, costs are low and implementation is easy.

With reference to the first aspect, in some implementations of the first aspect, the front controller is further configured to obtain, through the direct current bus, the information that is transmitted by the post controller and that indicates that high voltage ride-through occurs on the power grid.

With reference to the first aspect, in some implementations of the first aspect, the post controller is configured to: when detecting that high voltage ride-through occurs on the power grid, control a present voltage of the direct current bus, to enable the present voltage of the direct current bus to meet a preset first voltage characteristic, where the preset first voltage characteristic includes at least one of the following: a preset level, a preset level range, or a preset characteristic of a range of changing levels. The front controller is configured to: when detecting that the present voltage of the direct current bus meets the preset first voltage characteristic, determine that high voltage ride-through occurs on the power grid.

In the embodiments, when detecting that high voltage ride-through occurs on the power grid, the post voltage conversion apparatus may control the voltage of the direct current bus, to enable the voltage of the direct current bus to meet the preset first voltage characteristic. The first voltage characteristic indicates that high voltage ride-through occurs on the power grid. When detecting that the present voltage of the direct current bus meets the preset first voltage characteristic, the front voltage conversion apparatus may determine that high voltage ride-through occurs on the power grid, and accordingly update the present voltage of the direct current bus. In this control solution, the high-speed communication cable is not needed for transmitting, between the front controller and the post controller, the information indicating that high voltage ride-through occurs on the power grid. In other words, voltage control on the direct current bus does not need to depend on the high-speed communication cable, and a bus voltage control reference can be quickly updated.

With reference to the first aspect, in some implementations of the first aspect, the front controller is further configured to: after obtaining the information indicating that high voltage ride-through occurs on the power grid, update the present voltage of the direct current bus.

With reference to the first aspect, in some implementations of the first aspect, the post controller is further configured to transmit, to the front controller through the direct current bus, information indicating that the power grid exits high voltage ride-through. The front controller is further configured to obtain, through the direct current bus, the information that is transmitted by the post controller and that indicates that the power grid exits high voltage ride-through.

With reference to the first aspect, in some implementations of the first aspect, the post controller is configured to: when detecting that the power grid exits high voltage ride-through, control the present voltage of the direct current bus, to enable the present voltage of the direct current bus to meet a preset second voltage characteristic, where the preset second voltage characteristic includes at least one of the following: a preset level, a preset level range, or a preset characteristic of a range of changing levels. The front controller is configured to: when detecting that the present voltage of the direct current bus meets the preset second voltage characteristic, determine that the power grid exits high voltage ride-through.

With reference to the first aspect, in some implementations of the first aspect, the front controller is further configured to: after obtaining the information indicating that the power grid exits high voltage ride-through, restore a manner that is of voltage control on the direct current bus and that is used before high voltage ride-through.

With reference to the first aspect, in some implementations of the first aspect, the post controller includes a first sampling unit and a first control unit. The first sampling unit is configured to: collect present voltage information of the power grid and send the present voltage information of the power grid to the first control unit. The first control unit is configured to: receive the present voltage information of the power grid; determine, based on the present voltage information of the power grid, that high voltage ride-through occurs on the power grid; and control the present voltage of the direct current bus, to enable the present voltage of the direct current bus to meet the preset first voltage characteristic.

With reference to the first aspect, in some implementations of the first aspect, the front controller includes a second sampling unit and a second control unit. The second sampling unit is configured to: collect present voltage information of the direct current bus and send the present voltage information of the direct current bus to the second control unit. The second control unit is configured to: receive the present voltage information of the direct current bus; determine, based on the present voltage information of the direct current bus, whether the present voltage of the direct current bus meets the preset first voltage characteristic; and when the present voltage of the direct current bus meets the preset first voltage characteristic, determine that high voltage ride-through occurs on the power grid.

According to a second aspect, a control method for a power supply system is provided. The method is performed by a control system. The control system includes a front voltage conversion apparatus and a post voltage conversion apparatus. The front voltage conversion apparatus includes a front controller and a front voltage conversion circuit, where the front controller is configured to control the front voltage conversion circuit to: receive electric energy provided by a power supply module that is in a power supply system, and supply power to the post voltage conversion apparatus through a direct current bus after the front voltage conversion circuit performs direct current voltage conversion. The post voltage conversion apparatus includes a post controller and a post voltage conversion circuit, where the post controller is configured to control the post voltage conversion circuit to: receive, through the direct current bus, electric energy transmitted by the front voltage conversion apparatus, and supply power to a power grid after the post voltage conversion circuit performs direct current to alternating current voltage conversion. The method includes: The post controller transmits, to the front controller through the direct current bus, information indicating that high voltage ride-through occurs on the power grid.

In the embodiments, the post controller may transmit, to the front controller through the direct current bus, the information indicating that high voltage ride-through occurs on the power grid. In this control solution, a high-speed communication cable is not needed for transmitting, between the front controller and the post controller, the information indicating that high voltage ride-through occurs on the power grid. In other words, voltage control on the direct current bus does not need to depend on the high-speed communication cable, thereby improving control efficiency of the power supply system.

In addition, in the embodiments, voltage control on the direct current bus may not be limited by a communication speed, and therefore, costs are low and implementation is easy.

With reference to some implementations of the second aspect, the method further includes: The front controller obtains, through the direct current bus, the information that is transmitted by the post controller and that indicates that high voltage ride-through occurs on the power grid.

With reference to the second aspect, in some implementations of the second aspect, that the post controller transmits, to the front controller through the direct current bus, information indicating that high voltage ride-through occurs on the power grid includes: When detecting that high voltage ride-through occurs on the power grid, the post controller controls a present voltage of the direct current bus, to enable the present voltage of the direct current bus to meet a preset first voltage characteristic, where the first voltage characteristic includes at least one of the following: a preset level, a preset level range, or a preset characteristic of a range of changing levels. That the front controller obtains, through the direct current bus, the information that is transmitted by the post controller and that indicates that high voltage ride-through occurs on the power grid includes: When detecting that the present voltage of the direct current bus meets the preset first voltage characteristic, the front controller determines that high voltage ride-through occurs on the power grid.

In the embodiments, when detecting that high voltage ride-through occurs on the power grid, the post voltage conversion apparatus may control the voltage of the direct current bus, to enable the voltage of the direct current bus to meet the preset first voltage characteristic. The first voltage characteristic indicates that high voltage ride-through occurs on the power grid. When detecting that the present voltage of the direct current bus meets the preset first voltage characteristic, the front voltage conversion apparatus may determine that high voltage ride-through occurs on the power grid, and accordingly update the present voltage of the direct current bus. In this control solution, the high-speed communication cable is not needed for transmitting, between the front controller and the post controller, the information indicating that high voltage ride-through occurs on the power grid. In other words, voltage control on the direct current bus does not need to depend on the high-speed communication cable, and a bus voltage control reference can be quickly updated.

According to a third aspect, a post voltage conversion apparatus for a power supply system is provided. The apparatus includes a post voltage conversion circuit and a post controller, where the post controller is configured to control the post voltage conversion circuit to: receive, through a direct current bus, electric energy transmitted by a front voltage conversion apparatus, and supply power to a power grid after the post voltage conversion circuit performs direct current to alternating current voltage conversion, where the front voltage conversion apparatus includes a front controller and a front voltage conversion circuit, the front controller is configured to control the front voltage conversion circuit to: receive electric energy provided by a power supply module that is in a power supply system, and supply power to the post voltage conversion apparatus through the direct current bus after the front voltage conversion circuit performs direct current voltage conversion. The post controller is further configured to transmit, to the front controller through the direct current bus, information indicating that high voltage ride-through occurs on the power grid.

In the embodiments, the post controller may transmit, to the front controller through the direct current bus, the information indicating that high voltage ride-through occurs on the power grid. In this control solution, a high-speed communication cable is not needed for transmitting, between the front controller and the post controller, the information indicating that high voltage ride-through occurs on the power grid. In other words, voltage control on the direct current bus does not need to depend on the high-speed communication cable, thereby improving control efficiency of the power supply system.

In addition, in the embodiments, voltage control on the direct current bus may not be limited by a communication speed, and therefore, costs are low and implementation is easy.

With reference to some implementations of the third aspect, the post controller is configured to: when detecting that high voltage ride-through occurs on the power grid, control a present voltage of the direct current bus, to enable the present voltage of the direct current bus to meet a preset first voltage characteristic, where the preset first voltage characteristic includes at least one of the following: a preset level, a preset level range, or a preset characteristic of a range of changing levels.

With reference to some implementations of the third aspect, the post controller is further configured to: transmit, to the front controller through the direct current bus, information indicating that the power grid exits high voltage ride-through.

With reference to some implementations of the third aspect, the post controller is configured to: when detecting that the power grid exits high voltage ride-through, control the present voltage of the direct current bus, to enable the present voltage of the direct current bus to meet a preset second voltage characteristic, where the preset second voltage characteristic includes at least one of the following: a preset level, a preset level range, or a preset characteristic of a range of changing levels.

With reference to the third aspect, in some implementations of the third aspect, the post controller includes a sampling unit and a control unit. The sampling unit is configured to: collect present voltage information of the power grid and send the present voltage information of the power grid to the control unit. The control unit is configured to: receive the present voltage information of the power grid; determine, based on the present voltage information of the power grid, that high voltage ride-through occurs on the power grid; and control the present voltage of the direct current bus, to enable the present voltage of the direct current bus to meet the preset first voltage characteristic.

With reference to the third aspect, in some implementations of the third aspect, the post controller includes a sampling unit and a control unit. The sampling unit is configured to: collect present voltage information of the power grid and send the present voltage information of the power grid to the control unit. The control unit is configured to: receive the present voltage information of the power grid; determine, based on the present voltage information of the power grid, that the power grid exits high voltage ride-through; and control the present voltage of the direct current bus, to enable the present voltage of the direct current bus to meet the preset second voltage characteristic.

According to a fourth aspect, a front voltage conversion apparatus for a power supply system is provided. The apparatus includes a front voltage conversion circuit and a front controller, where the front controller is configured to control the front voltage conversion circuit to: receive electric energy provided by a power supply module that is in a power supply system, and supply power to a post voltage conversion apparatus through a direct current bus after the front voltage conversion circuit performs direct current voltage conversion, where the post voltage conversion apparatus includes a post controller and a post voltage conversion circuit, the post controller is configured to control the post voltage conversion circuit to: receive, through the direct current bus, electric energy transmitted by the front voltage conversion apparatus, and supply power to a power grid after the post voltage conversion circuit performs direct current to alternating current voltage conversion. The front controller is further configured to obtain, through the direct current bus, information that is transmitted by the post controller and that indicates that high voltage ride-through occurs on the power grid.

In the embodiments, the post controller may transmit, to the front controller through the direct current bus, the information indicating that high voltage ride-through occurs on the power grid. In this control solution, a high-speed communication cable is not needed for transmitting, between the front controller and the post controller, the information indicating that high voltage ride-through occurs on the power grid. In other words, voltage control on the direct current bus does not need to depend on the high-speed communication cable, thereby improving control efficiency of the power supply system.

In addition, in the embodiments, voltage control on the direct current bus may not be limited by a communication speed, and therefore, costs are low and implementation is easy.

With reference to some implementations of the fourth aspect, the front controller is configured to: when detecting that a present voltage of the direct current bus meets a preset first voltage characteristic, determine that high voltage ride-through occurs on the power grid, where the preset first voltage characteristic includes at least one of the following: a preset level, a preset level range, or a preset characteristic of a range of changing levels.

With reference to the fourth aspect, in some implementations of the fourth aspect, the front controller is further configured to: after obtaining the information indicating that high voltage ride-through occurs on the power grid, update the present voltage of the direct current bus.

With reference to the fourth aspect, in some implementations of the fourth aspect, the front controller is further configured to: obtain, through the direct current bus, information that is transmitted by the post controller and that indicates that the power grid exits high voltage ride-through.

With reference to the fourth aspect, in some implementations of the fourth aspect, the front controller is configured to: when detecting that the present voltage of the direct current bus meets a preset second voltage characteristic, determine that the power grid exits high voltage ride-through, where the preset second voltage characteristic includes at least one of the following: a preset level, a preset level range, or a preset characteristic of a range of changing levels.

DETAILED DESCRIPTION OF THE EMBODIMENTS

The following describes the embodiments with reference to accompanying drawings.

Figure 1:
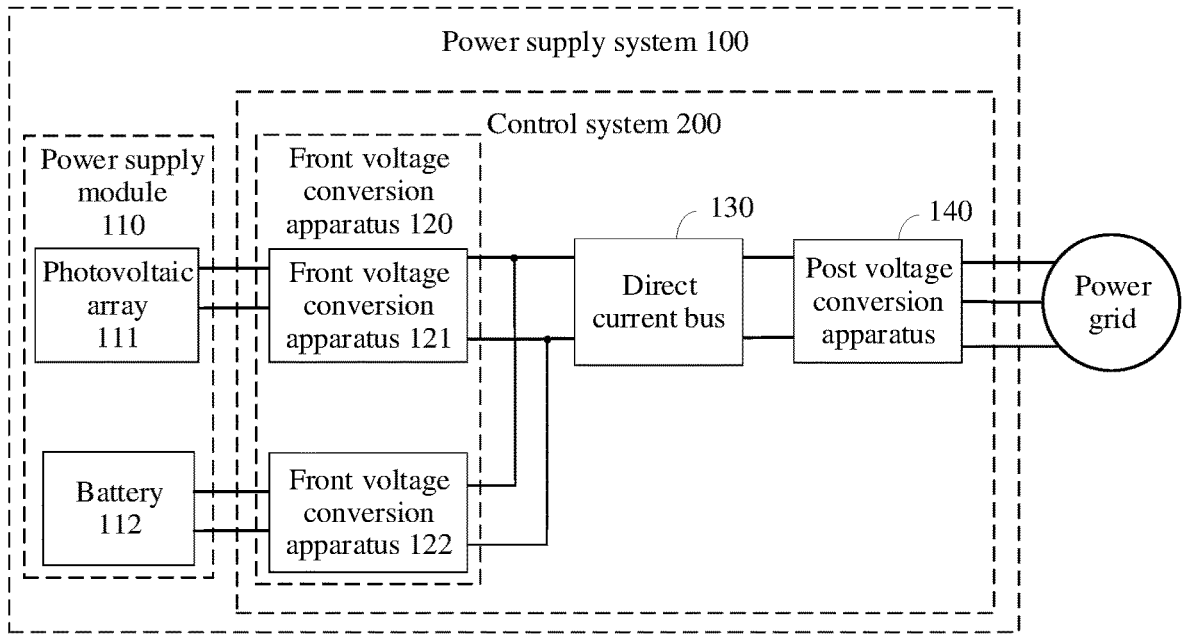
FIG. 1 is a schematic diagram of a structure of an application scenario applicable to an embodiment.

For ease of understanding the embodiments, an application scenario is first described with reference to FIG. 1. FIG. 1 is a schematic diagram of a structure of an application scenario applicable to an embodiment. As shown in FIG. 1, a power supply system 100 may generate an alternating current and may supply the generated alternating current to a power grid for power supply. The power supply system 100 may include a power supply module 110 and a control system 200, and the control system 200 may include a front voltage conversion apparatus 120 and a post voltage conversion apparatus 140. The power supply module 110 may output generated electric energy to the front voltage conversion apparatus 120. After performing direct current voltage conversion, the front voltage conversion apparatus 120 may supply power to the post voltage conversion apparatus 140 through a direct current bus 130. The post voltage conversion apparatus 140 may receive, through the direct current bus 130, electric energy transmitted by the front voltage conversion apparatus 120, and supply power to the power grid after performing direct current to alternating current voltage conversion. The power supply module 110 that provides the electric energy may include a photovoltaic (PV) array 111 and a battery 112. Electric energy of the photovoltaic array 111 is output to the direct current bus 130 after a front voltage conversion apparatus 121 performs direct current voltage conversion on the electric energy, and electric energy of the battery 112 is output to the direct current bus 130 after a front voltage conversion apparatus 122 performs direct current voltage conversion on the electric energy. The direct current bus 130 is connected to the front voltage conversion apparatus and the post voltage conversion apparatus, and power of the front voltage conversion apparatus and the post voltage conversion apparatus is transmitted through the direct current bus 130. The system in FIG. 1 is merely intended to describe an application scenario of the embodiments and is not intended to limit.

It should be understood that a connection relationship of a circuit is not limited in the embodiments. In actual application, other devices may be further connected between components in FIG. 1. For example, an output end of the post voltage conversion apparatus 140 may be directly connected to the power grid or may be connected to the power grid via a transformer. This is not limited.

The power supply system 100 that supplies power to the power grid may be a two-stage photovoltaic power generation system and the power supply module 110 may include only the photovoltaic array 111, and the front voltage conversion apparatus 120 may include only the front voltage conversion apparatus 121. The power supply module 110 may alternatively include only the battery 112, and the front voltage conversion apparatus 120 includes only the front voltage conversion apparatus 122. In this case, the power supply module 110 and the front voltage conversion apparatus 120 jointly form an electric energy storage system, and electric energy generated by the electric energy storage system is transmitted to the post voltage conversion apparatus 140 through the direct current bus 130. After the post voltage conversion apparatus 140 performs processing, an alternating current is obtained, and is provided for the power grid. Alternatively, the power supply system 100 may be a two-stage photovoltaic power generation system in an optical storage scenario, the power supply module 110 may include the photovoltaic array 111 and the battery 112, and the front voltage conversion apparatus 120 may include the front voltage conversion apparatus 121 and the front voltage conversion apparatus 122. It should be understood that, in an application scenario of the two-stage photovoltaic power generation system in this optical storage scenario, a direct current output by the front voltage conversion apparatus 121 may be alternatively provided to the battery 112 via the voltage conversion apparatus 122, and the battery 112 stores electric energy. When the power grid needs power supply, a direct current may be output via the voltage conversion apparatus 122 from the battery 112, and then is transmitted to the post voltage conversion apparatus 140 through the direct current bus 130. After the post voltage conversion apparatus 140 performs processing, an alternating current is obtained, and is provided for the power grid. The front voltage conversion apparatus 120 connected to the direct current bus 130 may include a plurality of apparatuses. Similarly, the post voltage conversion apparatus 140 connected to the direct current bus 130 may include a plurality of apparatuses. A topology of the front voltage conversion apparatus 120 may be a buck converter, a boost converter, a buck-boost converter, or a boost-buck converter, and may be of an isolated type or a non-isolated type. In addition, the front voltage conversion apparatus 121 that performs direct current voltage conversion for the photovoltaic array 111 and the front voltage conversion apparatus 122 that performs direct current voltage conversion for the battery 112 may be the same or may be different, and a topology structure of the front voltage conversion apparatus 121 and the front voltage conversion apparatus 122 is determined based on an actual circuit status. A topology structure of the front voltage conversion apparatus and a topology structure of the post voltage conversion apparatus are not limited. The front voltage conversion apparatus may include a direct current to direct current (DC/DC) converter, and the post voltage conversion apparatus 140 may include a power conversion system (PCS) or a direct current to alternating current (DC/AC) converter.

Figure 2:
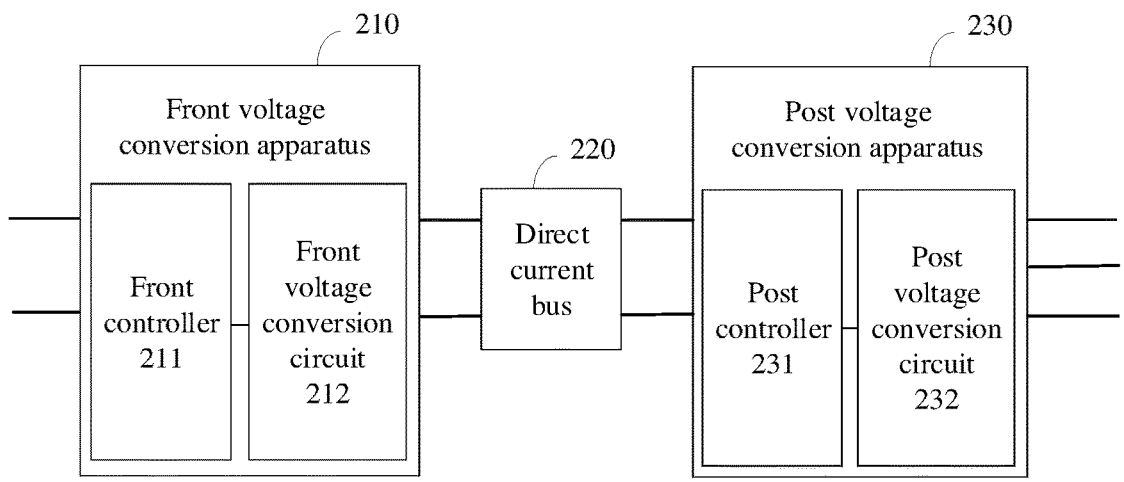
FIG. 2 is a schematic diagram of a structure of a control system for a power supply system according to an embodiment.

FIG. 2 is a schematic diagram of a structure of a control system for a power supply system according to an embodiment. As shown in FIG. 2, the control system includes a front voltage conversion apparatus 210 and a post voltage conversion apparatus 230, and an output end of the front voltage conversion apparatus 210 and an input end of the post voltage conversion apparatus 230 may be connected through a direct current bus 220. The front voltage conversion apparatus 210 may include a front controller 211 and a front voltage conversion circuit 212. The front controller 211 is configured to control the front voltage conversion circuit 212 to: receive electric energy provided by a power supply module that is in a power supply system, and supply power to the post voltage conversion apparatus 230 through the direct current bus 220 after the front voltage conversion circuit 212 performs direct current voltage conversion. The post voltage conversion apparatus 230 may include a post controller 231 and a post voltage conversion circuit 232. The post controller 231 is configured to control the post voltage conversion circuit 232 to: receive, through the direct current bus 220, electric energy transmitted by the front voltage conversion apparatus 210, and supply power to a power grid after the post voltage conversion circuit 232 performs direct current to alternating current voltage conversion. A part not shown in FIG. 2 may be the same as or different from that in FIG. 1.

In this embodiment, the post controller 231 may be further configured to transmit, to the front controller 211 through the direct current bus 220, information indicating that high voltage ride-through occurs on the power grid.

Therefore, in the embodiments, a post controller may transmit, to a front controller through a direct current bus, the information indicating that high voltage ride-through occurs on the power grid. In this control solution, a high-speed communication cable is not needed for transmitting, between the front controller and the post controller, the information indicating that high voltage ride-through occurs on the power grid. In other words, voltage control on the direct current bus does not need to depend on the high-speed communication cable, thereby improving control efficiency of the power supply system.

In addition, in the embodiments, voltage control on the direct current bus may not be limited by a communication speed, and therefore, costs are low and implementation is easy.

The post controller 231 may be configured to detect whether high voltage ride-through occurs on the power grid. When detecting that high voltage ride-through occurs on the power grid, the post controller 231 may calculate a voltage that is of the direct current bus 220 and that is required for high voltage ride-through, and control a present voltage of the direct current bus 220 via the post voltage conversion circuit 232, to enable the present voltage of the direct current bus 220 to meet a preset first voltage characteristic.

In an example, the preset first voltage characteristic may be a preset level, for example, 1450 V, or a preset level range, for example, 1400 V to 1500 V, or may be a preset characteristic of a range of changing levels, for example, a voltage reaches a threshold and a voltage change meets a characteristic in a period of time, or a range of continuously rising levels. The first voltage characteristic may be set on the following basis: (i) The first voltage characteristic can be effectively distinguished from a voltage characteristic in a normal running mode, so as to avoid false reporting. (ii) The first voltage characteristic is set with anti-interference to some extent, and an impact of a detection error or external power fluctuation can be controlled. (iii) The first voltage characteristic is set by comprehensively considering control difficulty of the post controller and recognition difficulty of the front controller.

In a possible implementation, after detecting that high voltage ride-through occurs on the power grid, the post controller 231 may further continue to detect whether the power grid exits high voltage ride-through, and the post controller 231 may be further configured to transmit, to the front controller 211 through the direct current bus 220, information indicating that the power grid exits high voltage ride-through.

If detecting that high voltage ride-through occurs on the power grid, the post controller 231 may further continue to detect whether the power grid exits high voltage ride-through. When detecting that the power grid exits high voltage ride-through, the post controller 231 may control the present voltage of the direct current bus 220 via the post voltage conversion circuit 232, to enable the present voltage of the direct current bus to meet a preset second voltage characteristic. If detecting that high voltage ride-through does not occur on the power grid or the power grid does not exit high voltage ride-through, the post controller 231 may maintain a present manner of voltage control on the direct current bus 220.

In an example, the second voltage characteristic may be a preset fixed level, for example, 1000 V, or a preset level range, for example, 800 V to 1200 V, or may be a preset characteristic of a range of changing levels, for example, a voltage reaches a threshold and a voltage change meets a characteristic in a period of time, or a range of slowly decreasing levels.

It should be understood that a type of the first voltage characteristic may be the same as or different from a type of the second voltage characteristic. This is not limited.

How to determine, based on a voltage of the power grid, whether the power grid enters high voltage ride-through may be set based on an actual situation, or may refer to a conventional technology. This is not limited. For example, the following manner may be used: If the voltage of the power grid is greater than a first voltage threshold (for example, 1.1 pu+0.015 pu) and lasts for first specified duration (for example, 2 ms), it is determined that the power grid enters high voltage ride-through. If the voltage of the power grid is less than a second voltage threshold (for example, 1.1 pu-0.043 pu) and lasts for second specified duration (for example, 3 ms), it is determined that the power grid exits high voltage ride-through. If the voltage of the power grid does not change significantly, it is determined that high voltage ride-through does not occur.

In this embodiment, the front controller 211 may be further configured to obtain, through the direct current bus 220, the information that is transmitted by the post controller 231 and that indicates that high voltage ride-through occurs on the power grid.

The front controller 211 may be configured to adjust the voltage of the direct current bus 220 based on the present voltage of the direct current bus 220, the preset first voltage characteristic, and the preset second voltage characteristic. The front controller 211 may detect whether the present voltage of the direct current bus meets the preset first voltage characteristic, and when detecting that the present voltage of the direct current bus 220 meets the preset first voltage characteristic, determine that high voltage ride-through occurs on the power grid.

In a possible implementation, the front controller 211 may be further configured to: after obtaining the information indicating that high voltage ride-through occurs on the power grid, update the present voltage of the direct current bus. In other words, after determining, through the direct current bus 220, that high voltage ride-through occurs on the power grid, the front controller 211 may update the present voltage of the direct current bus 220 via the front voltage conversion circuit 212.

In a possible implementation, updating the present voltage of the direct current bus 220 via the front voltage conversion circuit 212 includes: updating, via the front voltage conversion circuit 212, a control reference of the present voltage of the direct current bus 220 as $U_1+\Delta u$, where $U_1$ represents the presently detected voltage of the direct current bus, and $\Delta u$ represents a control margin. A value of $\Delta u$ may be determined based on implementation of the controller or may be determined based on an actual application situation. This is not limited.

It should be understood that the front controller 211 may be further configured to obtain, through the direct current bus 220, the information that is transmitted by the post controller 231 and that indicates that the power grid exits high voltage ride-through. In an example, after determining that high voltage ride-through occurs on the power grid, the front controller 211 may further continue to detect whether the voltage of the direct current bus meets the preset second voltage characteristic, so as to determine whether high voltage ride-through on the power grid ends.

When detecting that the voltage of the direct current bus 220 meets the preset first voltage characteristic, the front controller 211 may continue to detect whether the present voltage of the direct current bus 220 meets the preset second voltage characteristic, and when detecting that the present voltage of the direct current bus 220 meets the preset second voltage characteristic, determine that the power grid has exited high voltage ride-through.

In a possible implementation, the front controller 211 may be further configured to: after obtaining the information indicating that the power grid exits high voltage ride-through, restore a manner that is of voltage control on the direct current bus and that is used before high voltage ride-through. In other words, after determining, through the direct current bus 220, that the power grid exits high voltage ride-through, the front controller 211 may restore the manner that is of voltage control on the direct current bus and that is used before high voltage ride-through. If the present voltage of the direct current bus 220 does not meet the preset first voltage characteristic and the preset second voltage characteristic, the front controller 211 may maintain the present manner of voltage control on the direct current bus.

It should be understood that the manner that is of voltage control on the direct current bus and that is used before high voltage ride-through is related to a topology structure, a modulation manner, and the like of a circuit. Manners of voltage control on the direct current bus may be different in different topology structures and different modulation manners. A control manner of the direct current bus before high voltage ride-through may be determined based on an actual circuit situation, and this is not limited.

In this embodiment, the post controller may detect the voltage of the power grid, and determine, based on the present voltage of the power grid, that high voltage ride-through occurs on the power grid. When detecting that high voltage ride-through occurs on the power grid, the post controller may control the voltage of the direct current bus, to enable the voltage to meet the preset first voltage characteristic, where the first voltage characteristic indicates that high voltage ride-through occurs on the power grid. The front controller may detect the voltage of the direct current bus. When the present voltage of the direct current bus meets the preset first voltage characteristic, the front controller may determine that high voltage ride-through occurs on the power grid, and accordingly update the voltage of the direct current bus. In this control solution, the high-speed communication cable is not needed for transmitting, between the front controller and the post controller, the information indicating that high voltage ride-through occurs on the power grid. In other words, voltage control on the direct current bus does not need to depend on the high-speed communication cable, and the bus voltage control reference can be quickly updated, thereby improving control efficiency of the power supply system.

Figure 3:
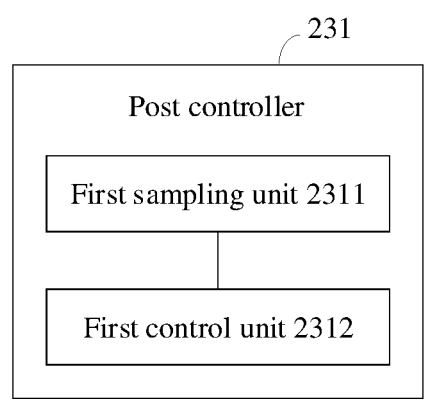
FIG. 3 is a schematic diagram of a structure of a post controller according to an embodiment.

FIG. 3 is a schematic diagram of a structure of a post controller 231 according to an embodiment. As shown in FIG. 3, the post controller 231 may include a first sampling unit 2311 and a first control unit 2312. The first sampling unit 2311 may be configured to: collect present voltage information of a power grid and may send the present voltage information of the power grid to the first control unit 2312, where the voltage information indicates a present voltage of the power grid. The first control unit 2312 may be configured to receive the present voltage information of the power grid, and determine, based on the present voltage information of the power grid, whether high voltage ride-through occurs on the power grid. When determining that high voltage ride-through occurs on the power grid, the first control unit 2312 may control a present voltage of a direct current bus via a post voltage conversion circuit 232, to enable the present voltage of the direct current bus to meet a preset first voltage characteristic, where the first voltage characteristic indicates that high voltage ride-through occurs on the power grid.

In a possible implementation, the first control unit 2312 may be further configured to determine, based on the present voltage information of the power grid, whether the power grid exits high voltage ride-through. When determining that the power grid exits high voltage ride-through, the first control unit 2312 may control the present voltage of the direct current bus via the post voltage conversion circuit 232, to enable the present voltage of the direct current bus to meet a preset second voltage characteristic, where the second voltage characteristic indicates that the power grid exits high voltage ride-through.

Figure 4:
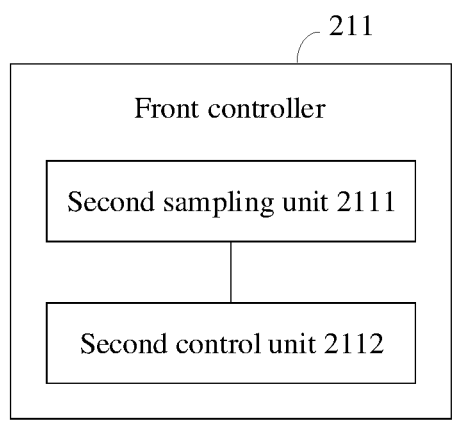
FIG. 4 is a schematic diagram of a structure of a front controller according to an embodiment.

FIG. 4 is a schematic diagram of a structure of a front controller 211 according to an embodiment. As shown in FIG. 4, the front controller 211 may include a second sampling unit 2111 and a second control unit 2112. The second sampling unit 2111 may be configured to: collect present voltage information of a direct current bus and send the present voltage information of the direct current bus to the second control unit 2112, where the present voltage information indicates a present voltage of the direct current bus. The second control unit 2112 may be configured to receive the present voltage information of the direct current bus, and determine, based on the present voltage information of the direct current bus, whether the present voltage of the direct current bus meets a preset first voltage characteristic. When the present voltage of the direct current bus meets the preset first voltage characteristic, the second control unit 2112 may determine that high voltage ride-through occurs on a power grid. Further, the second control unit 2112 may update the present voltage of the direct current bus via a front voltage conversion circuit 212.

In a possible implementation, the second control unit 2112 may be further configured to determine, based on the present voltage information of the direct current bus, whether the present voltage of the direct current bus meets a preset second voltage characteristic. When detecting that the present voltage of the direct current bus meets the preset second voltage characteristic, the second control unit 2112 may determine that the power grid exits high voltage ride-through. Further, the second control unit 2112 may restore a manner that is of voltage control on the direct current bus and that is used before high voltage ride-through.

In the embodiments, functions of the post controller may be separately implemented by the first sampling unit and the first control unit, and functions of the front controller may be separately implemented by the second sampling unit and the second control unit. Therefore, in embodiments, voltage control on the direct current bus during high voltage ride-through can be implemented in an existing system architecture, so that voltage control on the direct current bus does not need to depend on a high-speed communication cable, thereby improving control efficiency of a power supply system and reducing costs.

Figure 5:
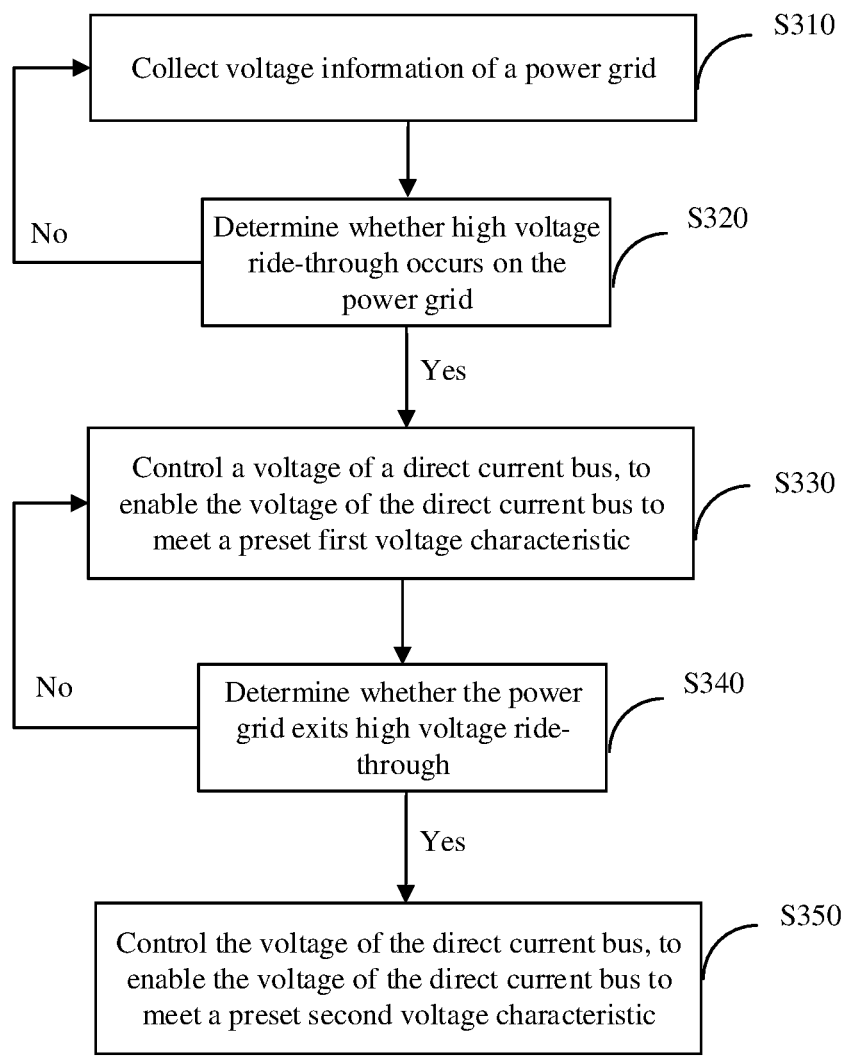
FIG. 5 is a control process of a post controller according to an embodiment.
Figure 6:
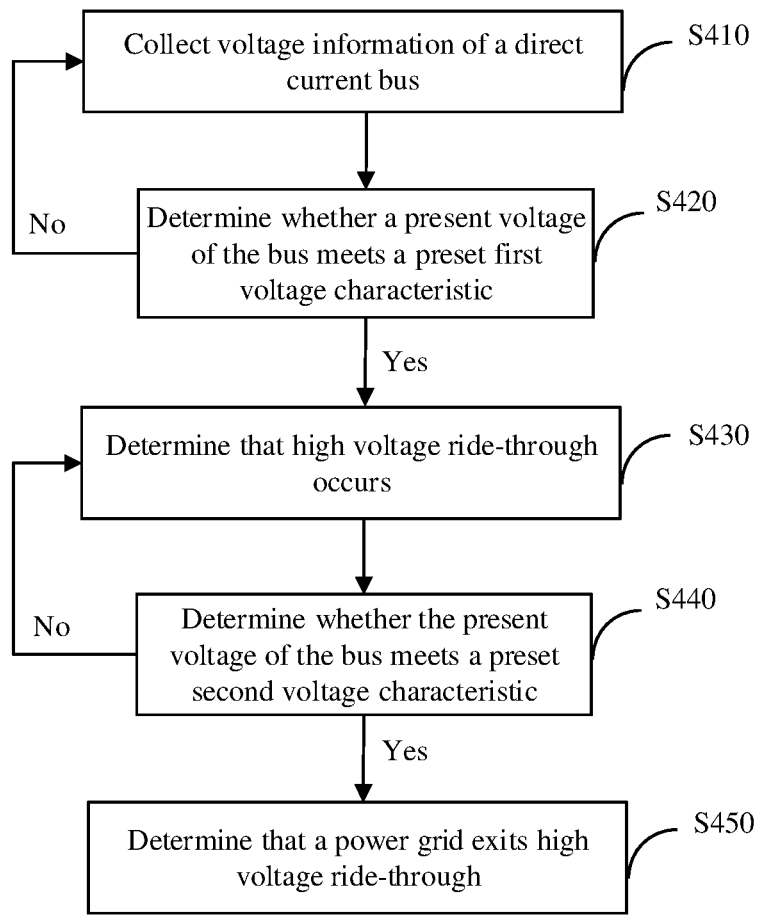
FIG. 6 is a control process of a front controller according to an embodiment.

The following describes in detail the control method with reference to FIG. 5 and FIG. 6.

FIG. 5 is a control process of a post controller according to an embodiment.

S310: Collect present voltage information of a power grid, where the voltage information indicates a present voltage of the power grid.

Collection of the voltage information of the power grid may be implemented by a circuit that has a sampling function and that is in a post voltage conversion apparatus or may be implemented by a first sampling unit that is in the post controller. The circuit or unit that implements the sampling function may have a communication interface with the power grid, so as to implement collection of the voltage information of the power grid.

S320: The post controller may determine, based on the present voltage information of the power grid obtained through collection, whether high voltage ride-through occurs on the power grid, and if high voltage ride-through does not occur on the power grid, the post controller may maintain a present manner of voltage control on a direct current bus, and continue to detect the voltage of the power grid. If high voltage ride-through occurs on the power grid, in other words, the power grid enters a high voltage ride-through mode, the post controller may perform control in step S330.

S330: When detecting that high voltage ride-through occurs on the power grid, the post controller may control a present voltage of the direct current bus via a post voltage conversion circuit, to enable the present voltage of the direct current bus to meet a preset first voltage characteristic, where the preset first voltage characteristic may be used by a front controller to determine that high voltage ride-through presently occurs on the power grid, so as to update the present voltage of the direct current bus.

S340: If high voltage ride-through occurs on the power grid, the post controller may further continue to determine whether the power grid exits high voltage ride-through, and if the power grid does not exit high voltage ride-through, the post controller may maintain the present manner of voltage control on the direct current bus, that is, maintain control in step S330, and continue to detect the voltage of the power grid. If the power grid exits high voltage ride-through, the post controller may perform control in step S350.

S350: When detecting that the power grid exits high voltage ride-through, the post controller may control the present voltage of the direct current bus via the post voltage conversion circuit, to enable the present voltage of the direct current bus to meet a preset second voltage characteristic, where the second voltage characteristic may be used by the front controller to determine that the power grid presently exits high voltage ride-through, so as to restore a manner that is of voltage control on the direct current bus and that is used before high voltage ride-through.

In this embodiment, the post controller may detect the voltage of the power grid in real time, determine, based on the voltage of the power grid, whether high voltage ride-through occurs on the power grid or the power grid exits high voltage ride-through, and accordingly control the voltage of the direct current bus. Therefore, the front controller may determine, based on a voltage change characteristic of the direct current bus, whether high voltage ride-through occurs on the power grid or the power grid exits high voltage ride-through, so that a high-speed communication cable is not needed for transmitting, between the front controller and the post controller, information indicating that high voltage ride-through occurs on the power grid or the power grid exits high voltage ride-through. In other words, voltage control on the direct current bus does not need to depend on the high-speed communication cable, thereby improving control efficiency of a power supply system.

FIG. 6 is a control process of a front controller according to an embodiment.

S410: Collect voltage information of a direct current bus, where the voltage information indicates a present voltage of the direct current bus.

, collection of the voltage information of the direct current bus may be implemented by a circuit that has a sampling function and that is in a front voltage conversion apparatus or may be implemented by a second sampling unit that is in the front controller. The circuit or unit that implements the sampling function may have a communication interface with the direct current bus, so as to implement collection of the voltage information of the bus.

S420: The front controller may determine, based on the voltage information of the direct current bus obtained through collection, whether the present voltage of the direct current bus meets a preset first voltage characteristic, and if the present voltage of the direct current bus does not meet the preset first voltage characteristic, the front controller may maintain a present manner of voltage control on the direct current bus, and continue to detect the voltage of the direct current bus. When detecting that the present voltage of the direct current bus meets the preset first voltage characteristic, the front controller may perform control in step S430.

S430: When detecting that the voltage of the direct current bus meets the preset first voltage characteristic, the front controller determines that high voltage ride-through occurs on a power grid and may update the voltage of the direct current bus via a front voltage conversion circuit. For example, a voltage control reference of the direct current bus may be updated as $U_1+\Delta u$, where $U_1$ represents the presently detected voltage of the bus, and $\Delta u$ represents a control margin.

S440: When detecting that the present voltage of the direct current bus meets the preset first voltage characteristic, the front controller may continue to determine whether the present voltage of the direct current bus meets a preset second voltage characteristic, and if the current voltage does not meet the preset second voltage characteristic, the front controller may determine that the power grid does not exit high voltage ride-through, may continue to maintain control in step S430, and continue to detect the voltage of the direct current bus. When detecting that the voltage of the direct current bus meets the preset second voltage characteristic, the front controller may perform control in step S450. That is, when detecting that the voltage of the direct current bus meets the preset first voltage characteristic, the front controller determines that high voltage ride-through occurs on the power grid, and then may continue to detect whether the voltage of the direct current bus meets the preset second voltage characteristic, so as to determine whether the power grid exits high voltage ride-through.

S450: When detecting that the voltage of the direct current bus meets the preset second voltage characteristic, the front controller determines that a power grid side has exited high voltage ride-through, may restore a manner that is of voltage control on the direct current bus and that is used before high voltage ride-through, and may control or adjust the voltage of the direct current bus via the front voltage conversion circuit.

In this embodiment, the front controller may detect the voltage of the direct current bus in real time, determine, based on a voltage change characteristic of the direct current bus, whether high voltage ride-through occurs on the power grid or the power grid exits high voltage ride-through, and further update or control the voltage of the direct current bus, so that a high-speed communication cable is not needed for transmitting, between the front controller and the post controller, information indicating that high voltage ride-through occurs on the power grid or the power grid exits high voltage ride-through. In other words, voltage control on the direct current bus does not need to depend on the high-speed communication cable, thereby improving control efficiency of a power supply system.

In the embodiments, the direct current bus is not only a power energy transmission station of the front and post voltage conversion apparatuses, but also a control data information exchange point between front and post devices.

Figure 7:
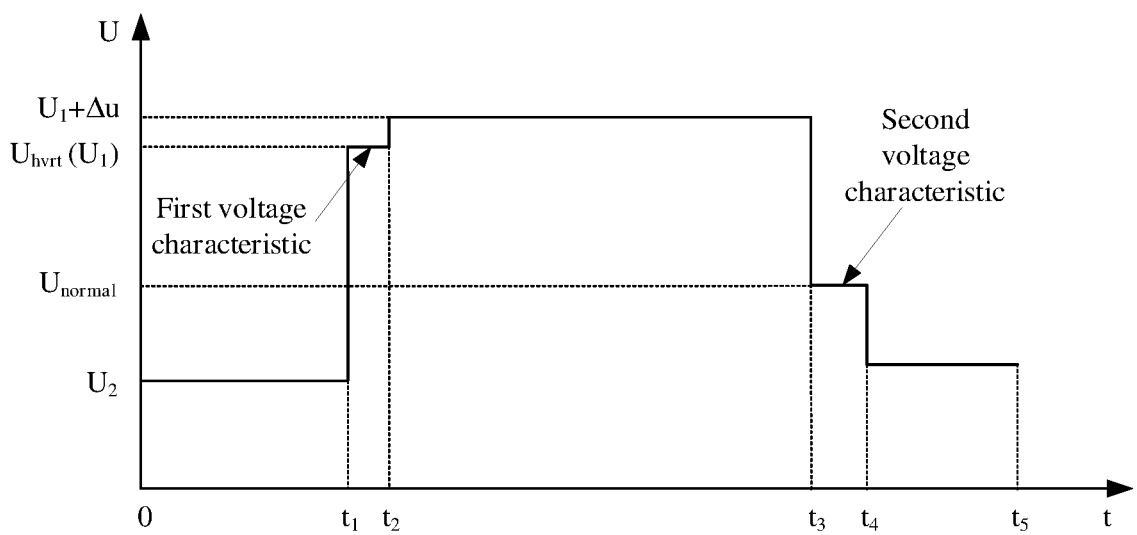
FIG. 7 is a schematic diagram of a voltage change process of a direct current bus in a control process of high voltage ride-through according to an embodiment.
Figure 8:
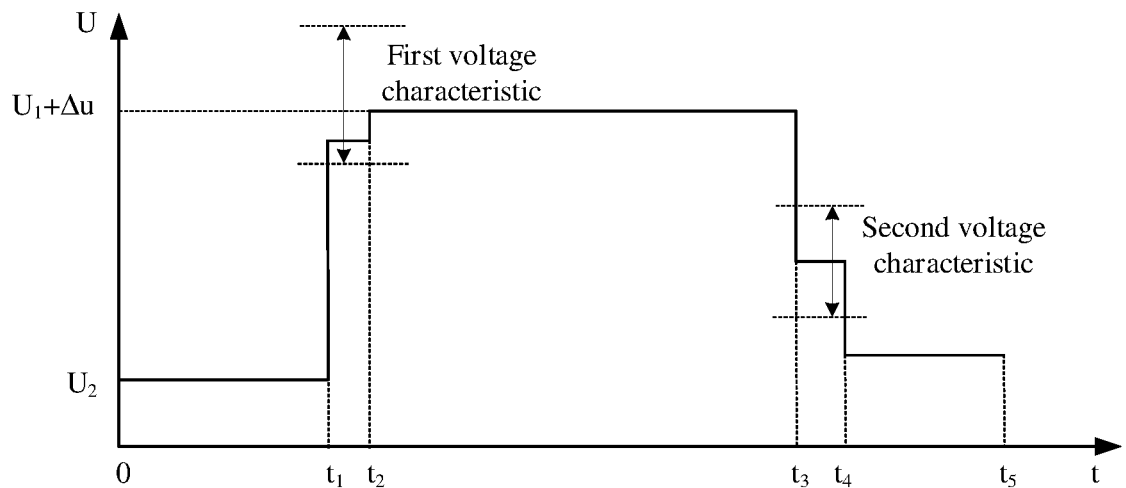
FIG. 8 is a schematic diagram of another voltage change process of a direct current bus in a control process of high voltage ride-through according to an embodiment.
Figure 9:
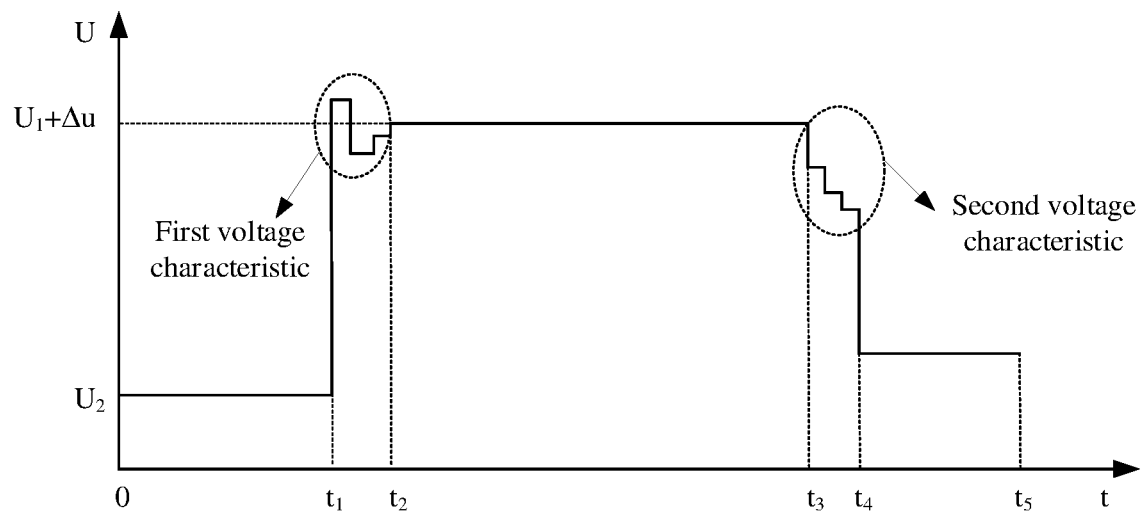
FIG. 9 is a schematic diagram of still another voltage change process of a direct current bus in a control process of high voltage ride-through according to an embodiment.

With reference to FIG. 7 to FIG. 9, the following describes a bus voltage change in a control process of high voltage ride-through in the embodiments. In FIG. 7 to FIG. 9, a horizontal coordinate represents time t, and a vertical coordinate represents a voltage U of a direct current bus.

FIG. 7 is a schematic diagram of a voltage change process of a direct current bus in a control process of high voltage ride-through according to an embodiment.

In a time period from 0 to $t_1$, a post controller detects a voltage of a power grid, and determines, based on the voltage of the power grid, that the power grid presently runs stably and that high voltage ride-through does not occur. Therefore, a front controller and the post controller jointly control a voltage of the direct current bus, to maintain the voltage of the direct current bus as a normal voltage $U_2$.

In a time period from $t_1$ to $t_2$, the post controller detects that high voltage ride-through occurs on the power grid, and therefore controls the voltage of the direct current bus via a post voltage conversion circuit, to enable the voltage of the direct current bus to be a preset eigenvalue $U_{hvrt}$ (an example of a first voltage characteristic). For example, the post controller may control the voltage of the direct current bus to be 1450 V, and the preset level may last for a period of time.

In a time period from $t_2$ to $t_3$, the front controller detects that the voltage of the direct current bus is the preset eigenvalue $U_{hvrt}$ and determines that high voltage ride-through occurs on the power grid. Therefore, the front controller may further update the voltage of the direct current bus via a front voltage conversion circuit. For example, the front controller may update the voltage of the direct current bus as 1470 V, where $\Delta u=20$ V represents a control margin. The eigenvalue $U_{hvrt}$ herein is also a presently detected voltage $U_1$ of the bus.

In a time period from $t_3$ to $t_4$, the post controller detects a voltage change of the power grid and determines that the power grid has exited high voltage ride-through, in other words, the power grid restores a normal mode. In this case, the post controller controls, via the post voltage conversion circuit, the voltage of the direct current bus to be a preset normal value $U_{normal}$ (an example of a second voltage characteristic). For example, the post controller may control the voltage of the direct current bus to be 1000 V, and the preset level may last for a period of time.

In a time period from $t_4$ to $t_5$, the front controller detects that the voltage of the direct current bus is the preset normal value $U_{normal}$. In this case, the front controller determines that the power grid has exited high voltage ride-through and may further restore a manner that is of voltage control on the direct current bus and that is used before high voltage ride-through.

It should be understood that values of the preset eigenvalue $U_{hvrt}$ and the normal value $U_{normal}$ may be determined based on an actual circuit topology and a control manner. This is not limited in the embodiments.

In the embodiments, the post controller detects the voltage of the power grid, and when determining, based on the voltage of the power grid, that high voltage ride-through occurs on the power grid, controls the voltage of the direct current bus to be the preset eigenvalue $U_{hvrt}$. When the voltage of the direct current bus reaches the preset eigenvalue $U_{hvrt}$, the front controller determines that high voltage ride-through occurs on the power grid, and accordingly updates the voltage of the direct current bus. In this control solution, voltage control on the direct current bus is easy to implement, and a high-speed communication cable is not needed for transmitting information indicating that high voltage ride-through occurs on the power grid, so that a bus voltage control reference can be quickly updated, and control efficiency of a power supply system is improved.

FIG. 8 is a schematic diagram of another voltage change process of a direct current bus in a control process of high voltage ride-through according to an embodiment.

In a time period from 0 to $t_1$, a post controller detects a voltage of a power grid, and determines, based on the voltage of the power grid, that the power grid presently runs stably and that high voltage ride-through does not occur. Therefore, a front controller and the post controller jointly control a voltage of the direct current bus, to maintain the voltage of the direct current bus as a normal voltage $U_2$.

In a time period from $t_1$ to $t_2$, the post controller detects that high voltage ride-through presently occurs on the power grid, and therefore controls the voltage of the direct current bus via a post voltage conversion circuit, to control the voltage of the direct current bus to be within a preset level range (an example of a first voltage characteristic). For example, the post controller may control the voltage of the direct current bus to be within a range from 1400 V to 1500 V (including 1400V and 1500V).

In a time period from $t_2$ to $t_3$, the front controller detects that the voltage of the direct current bus is within the preset level range. For example, the front controller detects that the present voltage of the direct current bus is 1420 V and is within the preset range from 1400 V to 1500 V and determines that high voltage ride-through occurs on the power grid. In this case, the front controller may further update the present voltage of the direct current bus via a front voltage conversion circuit. For example, the front controller may update the present voltage of the direct current bus as 1440 V, where the presently detected voltage $U_1$ of the direct current bus is 1420 V, and a control margin $\Delta u$ is 20 V.

In a time period from $t_3$ to $t_4$, the post controller detects, based on the voltage of the power grid, that the power grid has exited high voltage ride-through, in other words, the power grid restores a normal mode. In this case, the post controller controls, via the post voltage conversion circuit, the voltage of the direct current bus to be within another preset level range (an example of a second voltage characteristic). For example, the post controller may control the voltage of the direct current bus to be within a range from 800 V to 1200 V.

In a time period from $t_4$ to $t_5$, the front controller detects that the voltage of the direct current bus is within another preset level range. In this case, the front controller determines that the power grid has exited high voltage ride-through and may further restore a manner that is of voltage control on the direct current bus and that is used before high voltage ride-through.

In this embodiment, the post controller detects the voltage of the power grid, and when determining, based on the voltage of the power grid, that high voltage ride-through occurs on the power grid, controls the voltage of the direct current bus to be within a preset level range. When detecting that the voltage of the direct current bus reaches the preset level range, the front controller determines that high voltage ride-through occurs on the power grid, and accordingly updates the voltage of the direct current bus. In this control solution, efficiency of voltage control on the direct current bus is higher, and a high-speed communication cable is not needed for transmitting information indicating that high voltage ride-through occurs on the power grid, so that a bus voltage control reference can be quickly updated, and control efficiency of a power supply system is improved.

FIG. 9 is a schematic diagram of still another voltage change process of a direct current bus in a control process of high voltage ride-through according to an embodiment.

In a time period from 0 to $t_1$, a post controller detects a voltage of a power grid, and determines, based on the voltage of the power grid, that the power grid presently runs stably and that high voltage ride-through does not occur. Therefore, a front controller and the post controller jointly control a voltage of the direct current bus, to maintain the voltage of the direct current bus as a normal voltage $U_2$.

In a time period from $t_1$ to $t_2$, the post controller detects that high voltage ride-through presently occurs on the power grid, and therefore controls the voltage of the direct current bus via a post voltage conversion circuit, to enable the voltage of the direct current bus to reach a voltage threshold and meets a characteristic of a range of present level change (an example of a first voltage characteristic) in a time period. For example, the post controller may control the voltage of the direct current bus to be a range of levels that change between a high level and a low level, and an average value of the levels is 1500 V, and the levels last for 2 ms.

In a time period from $t_2$ to $t_3$, after detecting that the voltage of the direct current bus meets the preset level change characteristic, the front controller determines that high voltage ride-through occurs on the power grid. In this case, the front controller may further update the voltage of the direct current bus via a front voltage conversion circuit. For example, the front controller may update a voltage control reference of the direct current bus as a presently detected voltage $U_1+\Delta u$ of the bus, where $\Delta u$ represents a control margin.

In a time period from $t_3$ to $t_4$, the post controller detects, based on the voltage of the power grid, that the power grid has exited high voltage ride-through, in other words, the power grid restores a normal mode. In this case, the post controller may control the voltage of the direct current bus via the post voltage conversion circuit, to enable the voltage of the direct current bus to reach a voltage threshold and meets a preset level change characteristic (an example of a second voltage characteristic) in a time period. For example, the post controller may control the voltage of the bus to be levels that continuously decrease in a time period.

In a time period from $t_4$ to $t_5$, the front controller detects that the voltage of the direct current bus meets the preset level change characteristic. In this case, the front controller determines that the power grid has exited high voltage ride-through and may further restore a manner that is of voltage control on the direct current bus and that is used before high voltage ride-through.

In this embodiment, the post controller detects the voltage of the power grid, and when determining, based on the voltage of the power grid, that high voltage ride-through occurs on the power grid, controls the voltage of the direct current bus, to enable the voltage of the direct current bus to meet a preset level change characteristic. When detecting that the voltage of the direct current bus meets the preset level change characteristic, the front controller determines that high voltage ride-through occurs on the power grid, and accordingly updates the voltage of the direct current bus. In this control solution, the voltage of the direct current bus is controlled more accurately, and a high-speed communication cable is not needed for transmitting information indicating that high voltage ride-through occurs on the power grid, so that a bus voltage control reference can be quickly updated, and control efficiency of a power supply system is improved.

It should be understood that, in FIG. 7 to FIG. 9, in the time period from 0 to $t_1$, the voltage of the direct current bus is maintained as a stable level, and in the time period from $t_4$ to $t_5$, the voltage of the direct current bus is also maintained as a stable level. This is only a representation form of a control result of the voltage of the direct current bus in the two time periods. The embodiments may not limit a change status and a voltage of the direct current bus, that exists during stable running and after the front controller determines that the power grid exits high voltage ride-through. In an actual application, the voltage change status and the value that are of the direct current bus in the two time periods are determined based on an actual situation.

Figure 10:
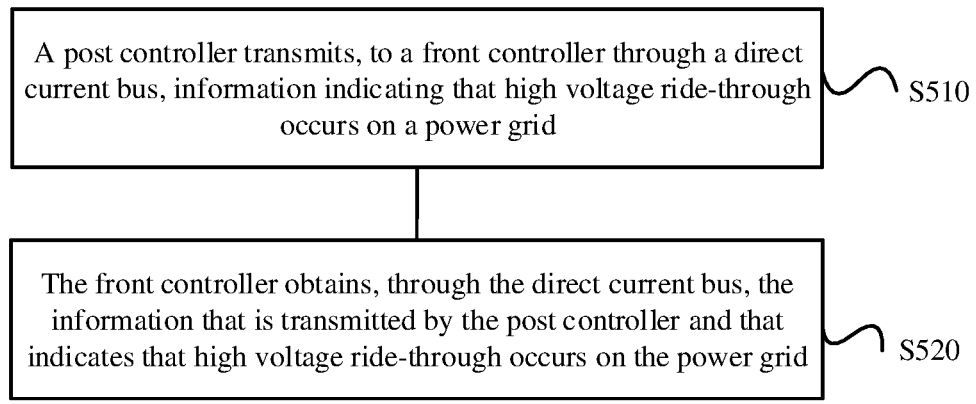
FIG. 10 is a schematic diagram of a control method for a power supply system according to an embodiment.

FIG. 10 is a schematic diagram of a control method for a power supply system according to an embodiment. The method is executed by a control system. The control system includes a post voltage conversion apparatus and a front voltage conversion apparatus. The front voltage conversion apparatus includes a front controller and a front voltage conversion circuit, where the front controller is configured to control the front voltage conversion circuit to: receive electric energy provided by a power supply module that is in a power supply system, and supply power to the post voltage conversion apparatus through a direct current bus after the front voltage conversion circuit performs direct current voltage conversion. The post voltage conversion apparatus includes a post controller and a post voltage conversion circuit, where the post controller is configured to control the post voltage conversion circuit to: receive, through the direct current bus, electric energy transmitted by the front voltage conversion apparatus, and supply power to a power grid after the post voltage conversion circuit performs direct current to alternating current voltage conversion.

The method includes the following steps.

S510: The post controller transmits, to the front controller through the direct current bus, information indicating that high voltage ride-through occurs on the power grid.

In the embodiments, the post controller may transmit, to the front controller through the direct current bus, the information indicating that high voltage ride-through occurs on the power grid. In this control solution, a high-speed communication cable is not needed for transmitting, between the front controller and the post controller, the information indicating that high voltage ride-through occurs on the power grid. In other words, voltage control on the direct current bus does not need to depend on the high-speed communication cable, thereby improving control efficiency of the power supply system.

In addition, in the embodiments, voltage control on the direct current bus may not be limited by a communication speed, and therefore, costs are low and implementation is easy.

In a possible implementation, the method further includes: S520: The front controller obtains, through the direct current bus, the information that is transmitted by the post controller and that indicates that high voltage ride-through occurs on the power grid.

In some examples, that the post controller transmits, to the front controller through the direct current bus, information indicating that high voltage ride-through occurs on the power grid includes: When detecting that high voltage ride-through occurs on the power grid, the post controller controls a present voltage of the direct current bus, to enable the present voltage of the direct current bus to meet a preset first voltage characteristic, where the first voltage characteristic may include at least one of the following: a preset level, a preset level range, or a preset characteristic of a range of changing levels. That the front controller obtains, through the direct current bus, the information that is transmitted by the post controller and that indicates that high voltage ride-through occurs on the power grid includes: When detecting that the present voltage of the direct current bus meets the preset first voltage characteristic, the front controller determines that high voltage ride-through occurs on the power grid.

In the embodiments, when detecting that high voltage ride-through occurs on the power grid, the post controller may control the voltage of the direct current bus, to enable the voltage of the direct current bus to meet the preset first voltage characteristic. The first voltage characteristic indicates that high voltage ride-through occurs on the power grid. When detecting that the present voltage of the direct current bus meets the preset first voltage characteristic, the front controller may determine that high voltage ride-through occurs on the power grid, and accordingly update the present voltage of the direct current bus. In this control solution, the high-speed communication cable is not needed for transmitting, between the front controller and the post controller, the information indicating that high voltage ride-through occurs on the power grid. In other words, voltage control on the direct current bus does not need to depend on the high-speed communication cable, and a bus voltage control reference can be quickly updated, thereby improving control efficiency of the power supply system.

In some examples, after the information indicating that high voltage ride-through occurs on the power grid is obtained, the method further includes: The front controller updates the present voltage of the direct current bus.

In some examples, that the front controller updates the present voltage of the direct current bus includes: The front controller updates the present voltage of the direct current bus as $U_1+\Delta u$, where $U_1$ represents the presently detected voltage of the direct current bus, and $\Delta u$ represents a control margin.

In some examples, that the front controller updates the present voltage of the direct current bus includes: The front controller updates the present voltage of the direct current bus via the front voltage conversion circuit.

In some examples, the method further includes: The post controller transmits, to the front controller through the direct current bus, information indicating that the power grid exits high voltage ride-through. The front controller obtains, through the direct current bus, the information that is transmitted by the post controller and that indicates that high voltage ride-through occurs on the power grid.

In some examples, that the post controller transmits, to the front controller through the direct current bus, information indicating that high voltage ride-through occurs on the power grid includes: When detecting that the power grid exits high voltage ride-through, the post controller controls the present voltage of the direct current bus via the post voltage conversion circuit, to enable the present voltage of the direct current bus to meet a preset second voltage characteristic, where the second voltage characteristic may include at least one of the following: a preset level, a preset level range, or a preset characteristic of a range of changing levels. That the front controller obtains, through the direct current bus, the information that is transmitted by the post controller and that indicates that high voltage ride-through occurs on the power grid includes: When detecting that the present voltage of the direct current bus meets the preset second voltage characteristic, the front controller determines that the power grid exits high voltage ride-through.

In some examples, after the front controller obtains the information indicating that the power grid exits high voltage ride-through, the method further includes: The front controller restores a manner that is of voltage control on the direct current bus and that is used before high voltage ride-through.

In some examples, that the post controller controls the present voltage of the direct current bus includes: The post controller controls the present voltage of the direct current bus via the post voltage conversion circuit.

In some examples, the post controller includes a first sampling unit and a first control unit. That the post controller controls, when detecting that high voltage ride-through occurs on the power grid, a present voltage of the direct current bus, to enable the present voltage of the direct current bus to meet a preset first voltage characteristic includes: The first sampling unit collects present voltage information of the power grid, and sends the present voltage information of the power grid to the first control unit. The first control unit receives the present voltage information of the power grid, determines, based on the present voltage information of the power grid, that high voltage ride-through occurs on the power grid, and controls the present voltage of the direct current bus, to enable the present voltage of the direct current bus to meet the preset first voltage characteristic.

In some examples, the front controller includes a second sampling unit and a second control unit. That the front controller determines, when detecting that the present voltage of the direct current bus meets the preset first voltage characteristic, that high voltage ride-through occurs on the power grid includes: The second sampling unit collects present voltage information of the direct current bus and sends the present voltage information of the direct current bus to the second control unit. The second control unit receives the present voltage information of the direct current bus, and determines, based on the present voltage information of the direct current bus, whether the voltage of the direct current bus meets the preset first voltage characteristic. When the present voltage of the direct current bus meets the preset first voltage characteristic, the second control unit determines that high voltage ride-through occurs on the power grid.

Figure 11:
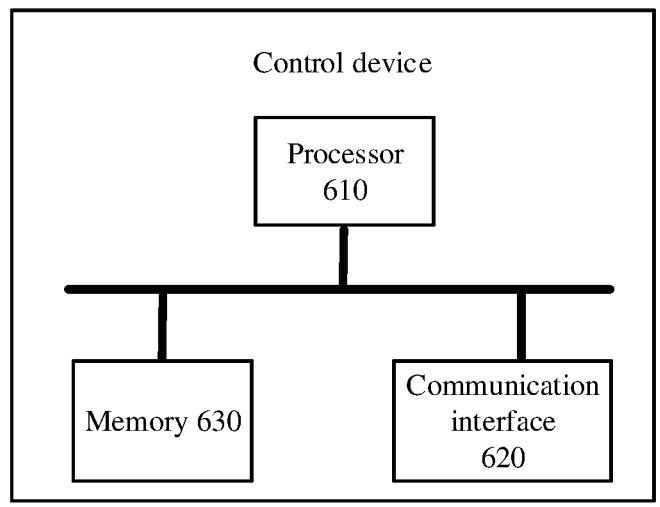
FIG. 11 is a schematic diagram of a structure of a control device according to an embodiment.

FIG. 11 is a schematic diagram of a structure of a control device according to an embodiment. As shown in FIG. 11, the control device includes a processor 610 and a communication interface 620. Optionally, the control device may further include a memory 630. Optionally, the memory 630 may be included in the processor 610. The processor 610, the communication interface 620, and the memory 630 communicate with each other through an internal connection path. The memory 630 is configured to store instructions. The processor 610 is configured to execute the instructions stored in the memory 630, to implement the control method provided in the embodiments.

Optionally, the control device may be configured to perform a function of the front controller 211 or the post controller 231 in FIG. 2, FIG. 3, and FIG. 4.

It should be understood that in this embodiment, implementation of a sampling function may include a sampling resistor, an operational amplifier, a conditioning circuit, and the like. Hardware structures of the first sampling unit 2311 and the second sampling unit 2111 are not limited. The structures may be determined based on an actual control method or system, provided that voltage sampling can be implemented.

Terminologies such as "component", "module", and "system" indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments, units and algorithm steps may be implemented by electronic hardware or a combination of computer software and electronic hardware. Whether functions are performed by hardware or software depends on particular applications. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatuses, and units, refer to a corresponding process in the foregoing method embodiments. Details are not described herein again.

In the several embodiments, it should be understood that the system, apparatuses, and methods may be implemented in other manners. For example, the described apparatus embodiments are merely examples. For example, division into the units is merely logical function division and may be other division in actual implementation. For example, a plurality of units or components may be combined or integrated into another system, or some characteristics may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments may be integrated into one processing unit, each of the units may exist alone physically, or two or more units are integrated into one unit.

When the functions are implemented in the form of a software functional unit and sold or used as an independent product, the functions may be stored in a non-transitory computer-readable storage medium. Based on such an understanding, the embodiments may be implemented in a form of a software product. The computer software product may be stored in a non-transitory storage medium and includes several instructions for instructing a computer device (which may be a personal computer, a server, a network device, or the like) to perform all or some of the steps of the methods described in the embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations but are not intended to limit the scope of the embodiments. Any variation or replacement readily figured out by a person skilled in the art shall fall within the scope of the embodiments.

The invention claimed is:

1. A control system for a power supply system, comprising:
   a front voltage conversion apparatus, wherein the front voltage conversion apparatus comprises a front controller and a front voltage conversion circuit and the front controller is configured to control the front voltage conversion circuit to:
   receive electric energy provided by a power supply module that is in a power supply system, and
   supply power to the post voltage conversion apparatus through a direct current bus after the front voltage conversion circuit performs direct current voltage conversion; and
   a post voltage conversion apparatus, wherein the post voltage conversion apparatus comprises a post controller and a post voltage conversion circuit and the post controller is configured to control the post voltage conversion circuit to:
   receive, through the direct current bus, electric energy transmitted by the front voltage conversion apparatus, and
   supply power to a power grid after the post voltage conversion circuit performs direct current to alternating current voltage conversion; and
   the post controller is further configured to transmit, to the front controller through the direct current bus, information indicating that high voltage ride-through occurs on the power grid,
   wherein the post controller is specifically configured to, when detecting that high voltage ride-through occurs on the power grid, control a present voltage of the direct current bus to enable the present voltage of the direct current bus to meet a preset first voltage characteristic, wherein the preset first voltage characteristic comprises at least one of the following: a preset level, a preset level range, and a preset characteristic of a range of changing levels; and
   the front controller is further configured to obtain, through the direct current bus, the information that is transmitted by the post controller and that indicates that high voltage ride-through occurs on the power grid.

2. The control system according to claim 1, wherein the front controller is further configured to:
   after obtaining the information indicating that high voltage ride-through occurs on the power grid, update the present voltage of the direct current bus.

3. The control system according to claim 2, wherein the post controller is further configured to transmit, to the front controller through the direct current bus, information indicating that the power grid exits high voltage ride-through; and
   the front controller is further configured to obtain, through the direct current bus, the information that is transmitted by the post controller and that indicates that the power grid exits high voltage ride-through.

4. The control system according to claim 3, wherein the post controller is further configured to: when detecting that the power grid exits high voltage ride-through, control the present voltage of the direct current bus, to enable the present voltage of the direct current bus to meet a preset second voltage characteristic, wherein the preset second voltage characteristic comprises at least one of the following: a preset level, a preset level range, or a preset characteristic of a range of changing levels; and
   the front controller is further configured to: when detecting that the present voltage of the direct current bus meets the preset second voltage characteristic, determine that the power grid exits high voltage ride-through.

5. The control system according to claim 4, wherein the front controller is further configured to:
   after obtaining the information indicating that the power grid exits high voltage ride-through, restore a manner that is of voltage control on the direct current bus and that is used before high voltage ride-through.

6. The control system according to claim 1, wherein the post controller further comprises:
   a first sampling unit, which is configured to:
   collect present voltage information of the power grid, and send the present voltage information of the power grid to the first control unit; and
   a first control unit, which is configured to:
   receive the present voltage information of the power grid;
   determine, based on the present voltage information of the power grid, that high voltage ride-through occurs on the power grid; and
   control the present voltage of the direct current bus, to enable the present voltage of the direct current bus to meet the preset first voltage characteristic.

7. The control system according to claim 1, wherein the front controller further comprises:
   a second sampling unit, which is configured to: collect present voltage information of the direct current bus, and send the present voltage information of the direct current bus to the second control unit; and
   a second control unit, which is configured to:
   receive the present voltage information of the direct current bus;
   determine, based on the present voltage information of the direct current bus, whether the present voltage of the direct current bus meets the preset first voltage characteristic; and
   when the present voltage of the direct current bus meets the preset first voltage characteristic, determine that high voltage ride-through occurs on the power grid.

8. A post voltage conversion apparatus for a power supply system, comprising:
   a post voltage conversion circuit;
   a post controller, which is configured to control the post voltage conversion circuit to: receive, through a direct current bus, electric energy transmitted by a front voltage conversion apparatus, and supply power to a power grid after the post voltage conversion circuit performs direct current to alternating current voltage conversion, wherein the front voltage conversion apparatus comprises a front controller and a front voltage conversion circuit, the front controller is configured to control the front voltage conversion circuit to: receive electric energy provided by a power supply module that is in a power supply system, and supply power to the post voltage conversion apparatus through the direct current bus after the front voltage conversion circuit performs direct current voltage conversion; and the post controller is further configured to transmit, to the front controller through the direct current bus, information indicating that high voltage ride-through occurs on the power grid, wherein the post controller is specifically configured to, when detecting that high voltage ride-through occurs on the power grid, control a present voltage of the direct current bus, to enable the present voltage of the direct current bus to meet a preset first voltage characteristic, wherein the preset first voltage characteristic comprises at least one of the following: a preset level, a preset level range, or a preset characteristic of a range of changing levels.

9. The post voltage conversion apparatus according to claim 8, wherein the post controller is further configured to:

transmit, to the front controller through the direct current bus, information indicating that the power grid exits high voltage ride-through.

10. The post voltage conversion apparatus according to claim 9, wherein the post controller is further configured to:

when detecting that the power grid exits high voltage ride-through, control the present voltage of the direct current bus, to enable the present voltage of the direct current bus to meet a preset second voltage characteristic, wherein the preset second voltage characteristic comprises at least one of the following: a preset level, a preset level range, or a preset characteristic of a range of changing levels.

11. The post voltage conversion apparatus according to claim 8, wherein the post controller further comprises:

a sampling unit configured to collect present voltage information of the power grid, and send the present voltage information of the power grid to the control unit; and a control unit that is configured to:

receive the present voltage information of the power grid;

determine, based on the present voltage information of the power grid, that high voltage ride-through occurs on the power grid; and control the present voltage of the direct current bus, to enable the present voltage of the direct current bus to meet the preset first voltage characteristic.

12. The post voltage conversion apparatus according to claim 10, wherein the post controller further comprises:

a sampling unit configured to collect present voltage information of the power grid, and send the present voltage information of the power grid to the control unit; and a control unit that is configured to:

receive the present voltage information of the power grid;

determine, based on the present voltage information of the power grid, that the power grid exits high voltage ride-through; and control the present voltage of the direct current bus, to enable the present voltage of the direct current bus to meet the preset second voltage characteristic.

13. A front voltage conversion apparatus for a power supply system, comprising:

a front voltage conversion circuit; and a front controller that is configured to control the front voltage conversion circuit to:

receive electric energy provided by a power supply module that is in a power supply system, and supply power to a post voltage conversion apparatus through a direct current bus after the front voltage conversion circuit performs direct current voltage conversion, wherein the post voltage conversion apparatus comprises a post controller and a post voltage conversion circuit, the post controller is configured to control the post voltage conversion circuit to: receive, through the direct current bus, electric energy transmitted by the front voltage conversion apparatus, and supply power to a power grid after the post voltage conversion circuit performs direct current to alternating current voltage conversion; and the front controller is further configured to obtain, through the direct current bus, information that is transmitted by the post controller and that indicates that high voltage ride-through occurs on the power grid, wherein the front controller is specifically configured to: when detecting that a present voltage of the direct current bus meets a preset first voltage characteristic, determine that high voltage ride-through occurs on the power grid, wherein the preset first voltage characteristic comprises at least one of the following: a preset level, a preset level range, or a preset characteristic of a range of changing levels.

14. The front voltage conversion apparatus according to claim 13, wherein the front controller is further configured to:

after obtaining the information indicating that high voltage ride-through occurs on the power grid, update the present voltage of the direct current bus.

15. The front voltage conversion apparatus according to claim 13, wherein the front controller is further configured to:

obtain, through the direct current bus, information that is transmitted by the post controller and that indicates that the power grid exits high voltage ride-through.

16. The front voltage conversion apparatus according to claim 15, wherein the front controller is further configured to:

when detecting that the present voltage of the direct current bus meets a preset second voltage characteristic, determine that the power grid exits high voltage ride-through, wherein the preset second voltage characteristic comprises at least one of the following: a preset level, a preset level range, or a preset characteristic of a range of changing levels.

* * * * *